United States Patent

[11] 3,586,278

[72] Inventor Donald M. Simons
2209 Centerville Road, Wilmington, Del. 19808
[21] Appl. No. 792,251
[22] Filed Jan. 21, 1969
[45] Patented June 22, 1971

[54] ARTICLE SUPPORT
20 Claims, 13 Drawing Figs.

[52] U.S. Cl............................................ 248/165,
95/86, 248/121, 248/183, 248/186
[51] Int. Cl.................................................F16m 11/32
[50] Field of Search......................................... 248/165,
164, 166, 178, 176, 150, 121, 48, 434, 177, 183,
186, 187; 95/86

[56] References Cited
UNITED STATES PATENTS
1,559,716 11/1925 Lingle et al................... 248/186
2,408,247 9/1946 Wekeman..................... 248/165
2,444,669 7/1948 Pollard et al.................. 248/165
2,505,990 5/1950 Pollock......................... 95/86
2,599,269 6/1952 Markle......................... 95/86
2,418,067 3/1947 Carpenter..................... 248/121
2,551,753 5/1951 McCullough................. 95/86

FOREIGN PATENTS
1,432,624 2/1966 France.......................... 248/183
326,736 10/1920 Germany...................... 248/183

Primary Examiner—Marion Parsons, Jr.
Attorney—Connolly and Hutz

ABSTRACT: An article support particularly adapted for holding a camera and accessory equipment includes a pair of parallel ways supported in a horizontal plane above the ground or other bearing surface by a pair of legs at each end thereof. The legs of each pair are secured at an appropriate angle to each other and at right angles to the median longitudinal axis of the ways. All legs are independently adjustable, the vertical component of adjustment permitting compensation for any deviations of the bearing surface from a smooth, horizontal plane. A pair of substantially vertical rods, vertically adjustable, are secured to and between the ways and also rest upon the bearing surface with articles being supported secured on adjustable mounting devices connected to the rods.

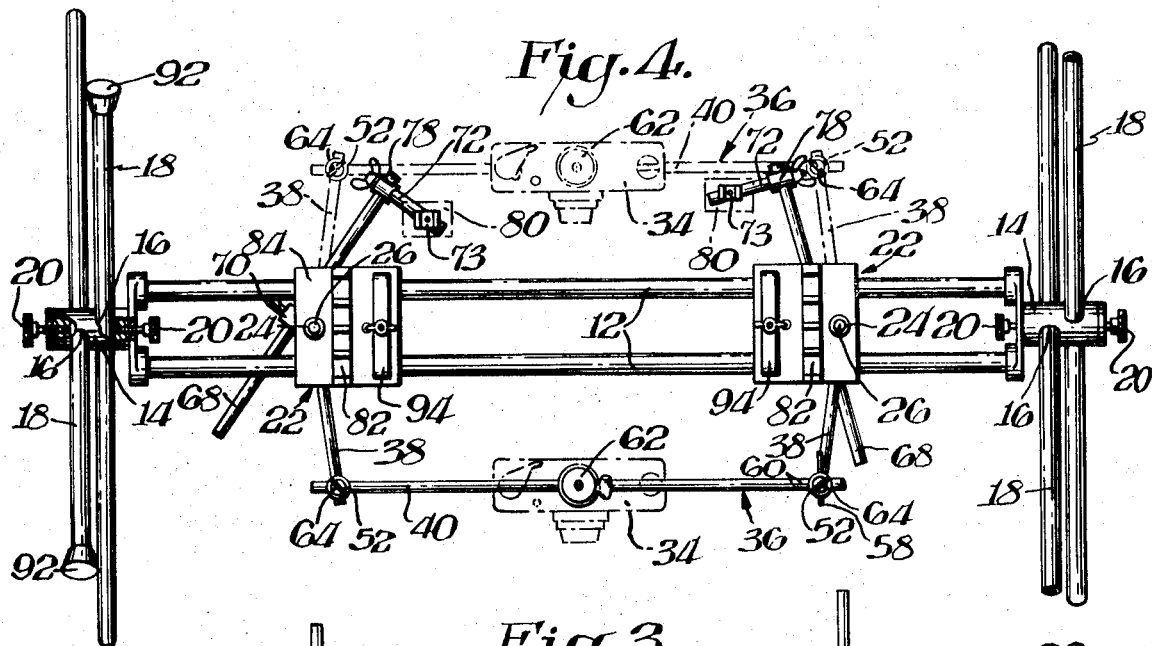
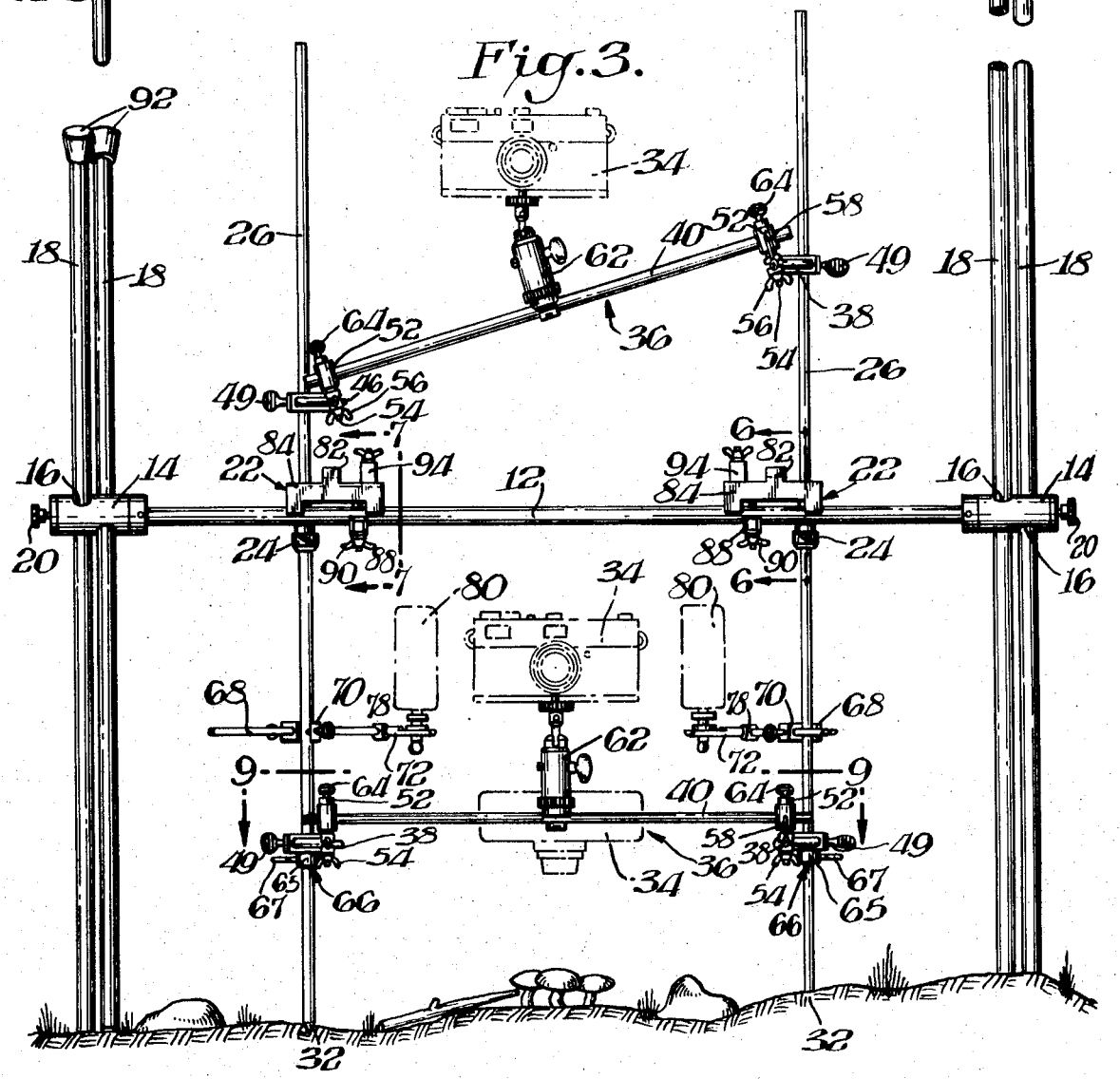

PATENTED JUN22 1971

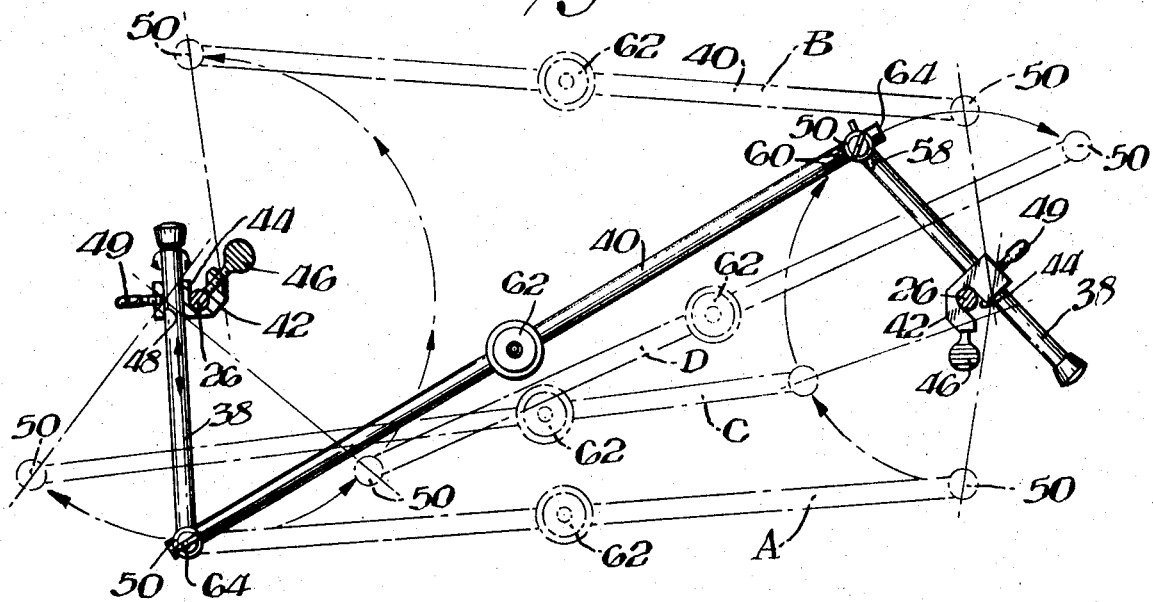
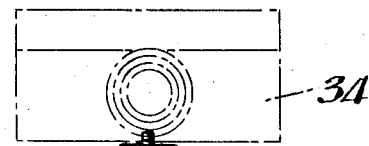
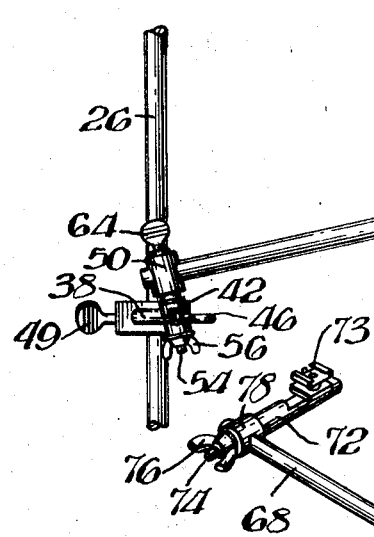
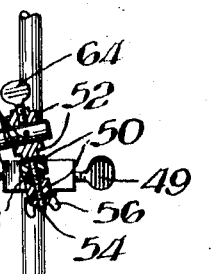
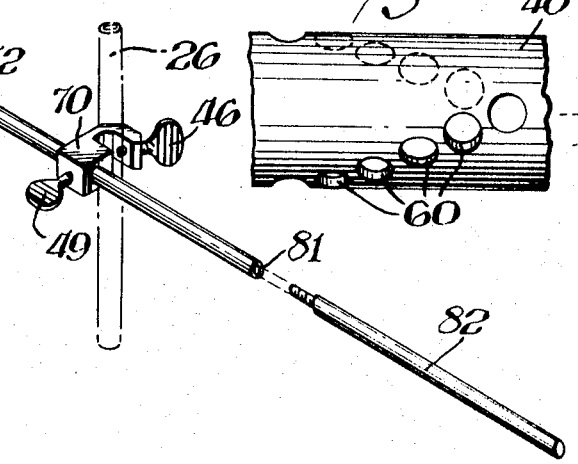
Fig. 9.
Fig. 10.
Fig. 11.
Fig. 12.
Fig. 13.

ARTICLE SUPPORT

BACKGROUND OF THE INVENTION

This invention relates to an article support and more particularly to a support for photographic equipment such as cameras and flash units. Various attempts have been made for supporting such photographic equipment. U.S. Pat. Nos. 2,408,247; 2,945,428 and 2,713,609 exemplify diverse approaches taken by the prior art. In general, however, the most commonly used camera support is a tripod having differing degrees of sophistication. These tripods while suitable for certain applications are in many instances unsatisfactory when close positioning of the camera to the subject is required. Additionally, these tripods do not provide convenient means for adjustably positioning auxiliary flash equipment commonly used in closeup photography.

With the growing interest in outdoor photography there is also a need for a camera support which can be mounted on the uneven and/or inclined surfaces encountered in the outdoor terrain. There is also a need for such a support which can securely dispose a camera and auxiliary flash equipment in various positions without interfering with their accessibility. Moreover with such supports adapted for outdoor use it is essential that the support be as lightweight and compact as possible to facilitate its being transported by the user. This consideration, however, is frequently offset by the need for a stable support.

SUMMARY OF INVENTION

An object of this invention is to provide an article support which can dispose the articles at various positions.

A further object is to provide such a support which is particularly adapted for use with a camera and with auxiliary flash equipment.

A still further object is to provide such a support which is both lightweight and compact in its stored condition and stable and secure in its functioning condition.

In accordance with this invention the support includes parallel ways having a pair of legs secured at each end at an angle to the plane of the ways. Each of the legs has a vertical component of adjustment permitting contact with a support surface such as the ground. Additionally, a pair of substantially vertical rods are adjustably secured to the ways for also resting upon the support surface, and article-positioning means are connected to the rods.

One of the article-positioning means may include a swivel assembly having a pair of swivel arms connected to the rods by specially provided mounting blocks to permit vertical, horizontal and rotational movement of the swivel arms. A swivel bar is rotationally connected to the swivel arms and has a universal joint rigidly mounted thereon for holding the article. Such an assembly described is particularly suited for positioning a camera.

An auxiliary article-positioning means, includes a single arm connected to a rod by a mounting block to permit vertical, horizontal and rotational movement of the arm. A short, rotatable extension is connected to the end of the arm and at right angles thereto and bears a rotatable fitting. This auxiliary assembly is particularly suited for positioning flash equipment. Any desired number of these assemblies may be attached to the support rods; however, one assembly attached to each rod is generally adequate.

The support may include grooved saddles securing the rods to a pair of ways. At least two of the legs are hollow so that the rods can be telescoped therein during the storage condition of the support. In its storage condition the four legs may be received in the grooves in the saddles whereupon the four legs and the ways form a skeletal box which may be used for holding other structural members of the support. If desired a removable housing can be inserted in the box to increase its storage ability. To facilitate the carrying of the support a strap or cord may be looped onto the skeletal box.

THE DRAWINGS

FIG. 3 is an elevation view of the article support of FIGS. 1—2 in different positions;

FIGS. 4 and 5 are top plan and side elevation views, respectively, of the article support shown in FIG. 3;

Figure 8:
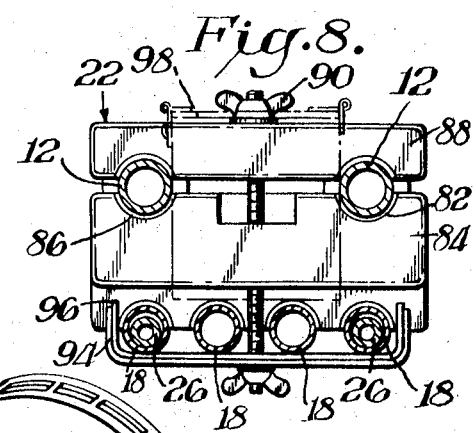
Figure 2:
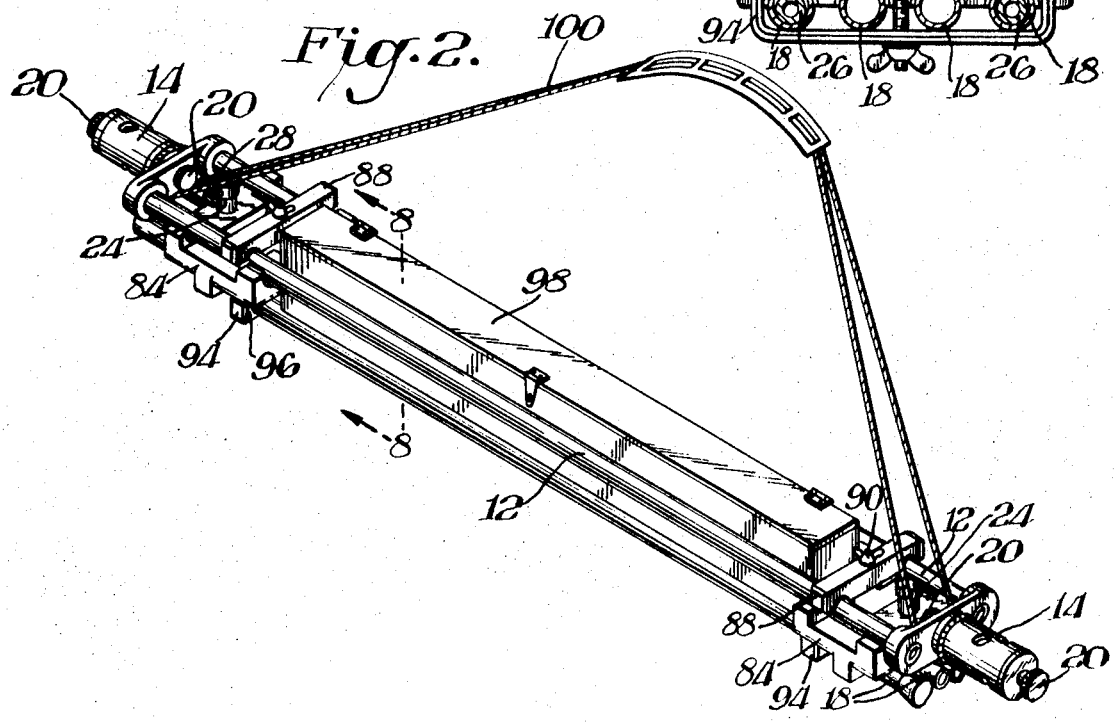
FIG. 2 is a perspective view of the article support of FIG. 1 in its nonuse condition.
Figure 6:
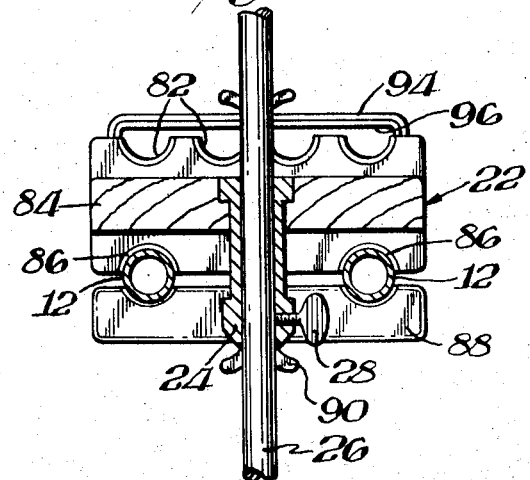
Figure 7:
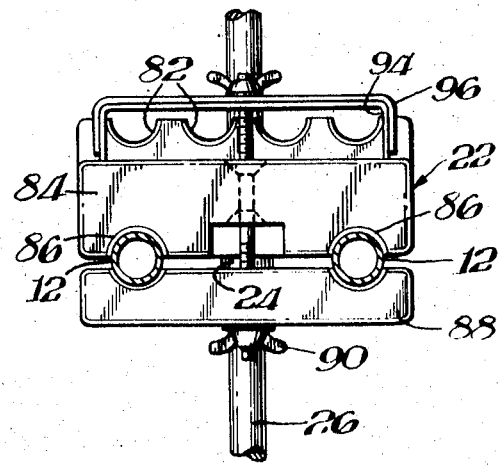

FIGS. 6 and 7 are cross-sectional views taken through FIG. 3 along the lines 6—6 and 7—7, respectively;

FIG. 8 is a cross-sectional view taken through FIG. 2 along the line 8—8;

FIG. 9 is a cross-sectional view taken through FIG. 3 along the line 9—9;

FIG. 10 is a front elevation view partly in section of the swivel assembly shown in FIG. 9;

FIG. 11 is a modified form of a portion of the swivel assembly shown in FIG. 10;

FIG. 12 is an enlarged view of a portion of the swivel assembly shown in FIGS. 9—10; and FIG. 13 is an end view of the portion of the swivel assembly.

DETAILED DESCRIPTION

Figure 1:
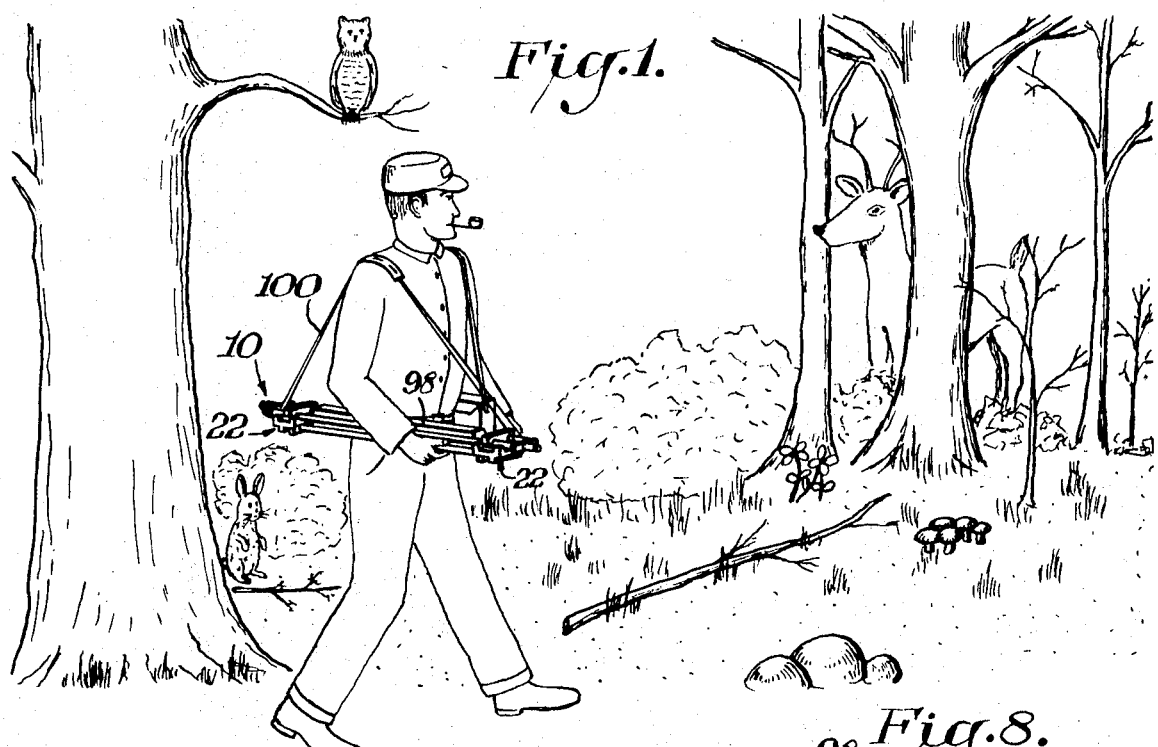
FIG. 1 is a perspective view of the article support of this invention carried by the user.

The article support of this invention is particularly adapted for outdoor use where it is frequently necessary for the user to carry it to places which can only be reached on foot. Such an article support is particularly adapted for holding a camera used for nature study photography where the subject is quite often at relatively inaccessible locations with varying types of terrain. As indicated in FIG. 1 the article support 10 of this invention is easily transported in its stored condition.

Figure 5:
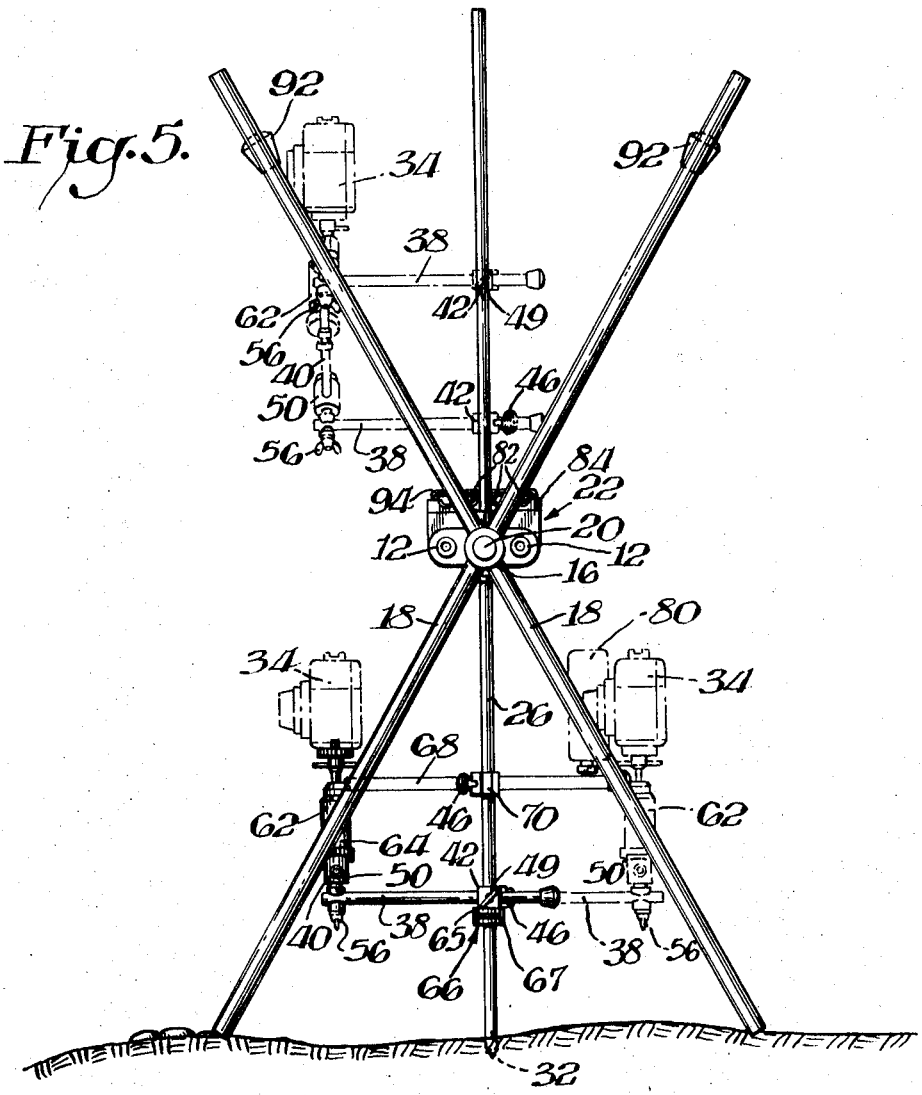

FIGS. 3—5 illustrate article support 10 during use. As indicated therein article support 10 includes a pair of horizontal ways 12 secured at their ends by end bushings 14. Each end bushing 14 includes a pair of apertures 16 for receiving legs 18 which are inclined with respect to the horizontal plane of parallel ways 12. A locking screw 20 is associated with each aperture so that the legs 18 are obliquely adjustable with respect to the ways 12 so as to securely rest on any irregular terrain. To prevent scratching of legs 18 by screws 20, each screw 20 bears against a nylon plug which in turn presses against a leg 18. Connected across ways 12 are saddles 22 which can be moved along ways 12 and locked in any desired position by tightening wingnut 90 against locking bar 88, this movement permitting the positioning and spacing of rods 26 as conditions of the natural terrain demand. Saddles 22 will be described in greater detail hereinafter. A bushing 24 extends through each saddle for receiving vertically adjustable rods 26 which are locked in position by locking screws 28 (see also FIG. 6). In this manner a stable support may be achieved by utilizing six spaced points of support. Advantageously digging surfaces are provided by forming the inclined legs 18 with flat ends 30 perpendicular to the longitudinal axis of each leg. The digging action of ends 30 is best illustrated in FIG. 5. Vertical rods 26, however, terminate in pointed ends 32 for digging the manner shown, for example, in FIG. 3.

The article, which in the preferred form is a camera 34, is held by an article-mounting device including a particularly advantageous swivel assembly 36. Swivel assembly 36 may best be understood by reference to FIGS. 3—4 and 9—10. The swivel assembly enables the camera 34 to be adjusted up-and-down, side-to-side and back-and-forth. As illustrated in FIGS. 3—4 and 9—10 swivel assembly 36 includes a pair of swivel arms 38 which are interconnected by a swivel bar 40. Arms 38 are connected to vertical rods 26 by means of mounting block 42 which includes a slot 44 for receiving rod 26 and with associated locking screw 46 to press against rod 26 (FIG. 9). Mounting block 42 also includes an aperture 48 through which swivel arm 32 may slide back-and-forth and also rotate. The positioning of swivel arm 38 is controlled by locking screw 49. As can be appreciated from FIG. 9 swivel arm 38 not only rotates about its own axis by loosening locking screw 49, but also rotates about rod 26 by loosening locking screw 46. As a safety feature vertical rods 26 are provided with sliding stops 66 which are best illustrated in FIGS. 3 and 5. Each stop 66 comprises a collar 65 through which a locking screw 67 extends. These stops abut against mounting blocks 42 and thus support the swivel assembly 36 when locking screws 46 are loosened slightly to permit rotation around rods 26.

Swivel bar 40 is connected to swivel arms 38 by adjusting means which are best illustrated in FIG. 10. As indicated therein this adjustable means includes a clamp 50 which receives swivel arm 38. Rotatably secured to the upper end of clamp 50 is apertured block 52 for receiving swivel bar 40. Block 52 includes a threaded extension 54 extending through arm 38 and clamp 50. Wingnut 56 on the end of extension 54 locks swivel arm 38 in place. Swivel bar 40 may rotate within block 52. Normally swivel bar 40 may be secured in the desired position by means of locking screws 64. However, when heavy articles are attached to universal joint 62 and a large torque is exerted on swivel bar 40, more positive security against accidental rotation of bar 40 may be desired. At one end of bar 40 is a positive rotation-locking arrangement including stop pin 58 (FIGS. 4 and 9) extending through block 52 and through one of a set of indexing holes 60 in bar 40. The indexing holes 60 are obliquely arranged about bar 40 to permit positive locking of bar 40 in a number of angular positions.

Rigidly secured on bar 40 is a universal joint 62 which may be of any suitable conventional structure for holding the camera 34.

FIGS. 3—5 and 9—10 illustrate only a few of the many different position that may be achieved with swivel assembly 36. The particular position is determined not only by the location of the subject being photographed but also by obstacles such as rocks and growth which may be present.

To appreciate the complete flexibility of swivel assembly 36 brief reference is made to FIG. 9 to show the change of positioning from position A to position B. Locking screws 46 for each vertical rod 26 are loosened slightly to permit swivel arms 38 to rotate about rods 26. (While the locking screws 46 are loosened the swivel assembly is supported on the rods 26 by the abutting stops 66 as previously described). Wingnut 54 is also loosened to permit relative rotation between split clamps 50 and blocks 52 which in turn allows swivel bar 40 to pivot relative to swivel arms 38. Finally lock screws 49 are loosened to permit swivel arms 38 to slide back and forth in mounting block 70. Swivel bar 40 may now be moved smoothly from position A through positions C and D to position B. Once the desired position is attained, all locking devices are tightened to secure the arrangement.

A particularly advantageous feature of this invention is not only the stable mounting of the camera, but also by the use of spaced vertical rods 26 this mounting is achieved in such a manner that the camera is completely accessible to the photographer by minimizing the interference that the support might otherwise present. This accessibility might best be appreciated from FIG. 3 which shows various camera positions.

A further feature of support 10 is the inclusion of auxiliary arms 68 (FIG. 3) each of which is secured to a vertical rod 26 by mounting block 70 constructed in the same manner as previously described mounting blocks 42. An offset extension 72 (FIG. 11) has a threaded axial portion 74 extending through an opening in arm 68 for relative rotation thereto and is locked in position by wingnut 76 pressing against collar 78 permanently attached to auxiliary arm 68. The end of offset 72 includes a rotatable conventional fitting 73 to receive, for example, a photographic light or flash unit 80. In a further modification of this invention the end of auxiliary arm 68 which is remote from offset portion 72 is internally threaded as at 81 for receiving a threaded extension 83 thus increasing effective length of arms 68. Since arms 68 are slidably secured to rods 26 by mounting blocks 70 each arm can be extended away from rod 26 substantially the entire combined length of extension 83 and arm 68.

It is to be emphasized that the purpose of the auxiliary assembly described above is to free the photographer from the necessity of attaching auxiliary photographic lights directly onto the camera as is required with many conventional systems. The conventional system is undesirable because only front-lighted exposures can be obtained, and such pictures are often aesthetically unpleasing. Additionally, they may fail to show details which are scientifically important. A further disadvantage of the conventional system arises from the fact that most photographers prefer to use electronic flash units for outdoor closeup photography. When an electronic flash unit is attached to the camera, the distance of the unit from the object being photographed is automatically fixed by the camera-to-object distance, and this in turn automatically determines the $f$/number which must be used in taking the picture. This required $f$/number may not yield a picture having satisfactory definition and/or depth of field to meet scientific or aesthetic requirements. Using the assembly described above, the photographer can avoid all disadvantages of the conventional system by choosing the appropriate $f$/number, without regard for the camera-to-object distance, and then positioning the photographic lights at the proper angle and distance from the object to give a perfect exposure.

Support 10 fulfills the needs of an outdoor photographer by providing a stable support which maintains the camera controls accessible regardless of the countless possible positions of the camera. The stabilizing positioning is enhanced by maintaining the center of gravity of the system within the perimeter defined by the four legs 18 regardless of the vertical adjustment of these legs. Additionally, support 10 enables the photographer to place and position auxiliary photographic lights in any location required for perfect exposures.

Not only does support 10 fulfill the needs of the outdoor photographer during actual use but also during storage and transportation. Where possible parts are made hollow and of lightweight material. Advantageously the parts are so designed that when support 10 is dismantled it occupies a minimum of space. In this respect FIGS. 1—2 and 6—8 are particularly pertinent for an understanding of how this compact storage unit is achieved. As indicated in FIGS. 6—7 saddles 22 include a set of four padded grooves 82 on top plate 84. A pair of padded grooves 86 are disposed on the underside of plate 84. Ways 12 are received in grooves 86 and held therein by padded grooved bottom plate or locking bar 88 secured to top plate 84 by means of threaded screw and locking nut 90 (FIG. 7).

The four top padded grooves 82 are designed to receive legs 18. Additionally, at least two of the legs 18 are hollow not only to cause the unit to be lightweight but also to receive vertical rods 26. Legs 18 are closed at their bottom ends to prevent dirt from entering the hollow legs when the legs dig into the ground during use of support 10, and also to prevent rods 26 from slipping out of the hollow legs when the rods are telescoped therein during storage. The legs-receiving rods 26 are provided with removable caps 92 (FIGS. 3—5). Of course caps may also be provided for all legs 18.

Legs 18 are maintained seated in grooves 82 by a U-shaped clamp 94 having a resilient padded clamping surface 96 for pressing against the legs. The stored condition of the saddle and way arrangement is turned 180° from that shown in FIGS. 6—7, to the stored condition illustrated in FIGS. 2 and 8. As best shown in FIG. 2 the four legs 18 form the bottom and the two ways 12 form the sides of a skeletal box for receiving various other components of support 10. If desired a removable housing 98 may be inserted within skeletal box to increase the storage capacity of the device. Conveniently a carrying strap 100 may be looped over various projections such as the exposed ends of legs 18 to facilitate the transportation of the device. Carrying strap 100 serves the added function of providing a convenient tying means which is frequently desired for outdoor photography to hold back, for example, small branches of trees and thus expose otherwise inaccessible subjects.

What I claim is:

1. An article support comprising way means, a pair of legs adapted to be secured to each end of said way means disposed at an angle thereto, each of said legs being obliquely adjustable with respect to said way means whereby each of said legs may rest upon a support surface, a pair substantially vertical rods, said rods being at least as long as the vertical component of each pair of said oblique legs, means for adjustably securing said rods to said way means whereby said rods may rest upon the support surface, and article-mounting means extending between and connected to both of said rods with both of said rods thereby acting jointly as means for holding the article.

2. A support as set forth in claim 1 wherein said article-mounting means is adapted to position the article within the perimeter formed by said two pair of legs.

3. A support as set forth in claim 2 wherein said article mounting means includes a swivel assembly for controlling the up-and-down and the side-to-side and the back-and-forth positioning of the article.

4. A support as set forth in claim 3 wherein said swivel assembly includes a pair of swivel arms, a mounting block connecting each swivel arm to a rod for vertical and horizontal and rotational movement therewith, a swivel bar rotationally connected to said swivel arms, and a universal joint mounted on said swivel bar for holding the article.

5. A support as set forth in claim 4 wherein each of said mounting blocks includes a slot and an aperture disposed substantially perpendicular to each other for receiving one of said swivel arms and its rod, locking means associated with each of said slot and said aperture, said swivel bar having a series of obliquely arranged indexing holes, said swivel bar being secured to one of said swivel arms by a connecting member, and a stop pin in said connecting member engageable with one of said indexing holes.

6. A support as set forth in claim 5 including an auxiliary arm secured to each rod by one of said mounting blocks, and each of said auxiliary arms having an offset at one end thereof secured thereto by rotation means.

7. A support as set forth in claim 6 including fastening means at the other end of each auxiliary arm for receiving an extension, and stop means on each rod to limit the downward movement of said swivel assembly.

8. An article support comprising way means, a pair of legs adapted to be secured to each end of said way means disposed at an angle thereto, each of said legs being obliquely adjustable with respect to said way means whereby each of said legs may rest upon a support surface, a pair substantially vertical rods, means for adjustably securing said rods to said way means whereby said rods may rest upon the support surface, and article-mounting means for connection to said rods, said article-mounting means being adapted to position the article within the perimeter formed by said two pair of legs, said way means includes a pair of parallel ways, and said means for adjustably securing said rods including a grooved saddle for each of said rods.

9. A support as set forth in claim 8 wherein at least two of said legs are hollow having chambers therein of sufficient size to telescopically receive said rods, and removable caps for at least two of said legs.

10. A support as set forth in claim 9 wherein each of said saddles has four grooves, and the grooves of one saddle being aligned with the grooves of the other saddle, for the seating of said legs in the stored condition of said support.

11. A support as set forth in claim 10 wherein said way means further includes a pair of end bushings connected to said ways, a pair of apertures in each of said bushings for receiving a pair of said legs and locking means associated with each aperture.

12. A support as set forth in claim 11 wherein said legs terminate in flat ends perpendicular to the longitudinal axis of each leg and said rods terminate in pointed ends for digging into the support surface.

13. A support as set forth in claim 12 wherein each of said saddles includes a top plate, said grooves being padded, an opening extending through said plate with a bushing therein for receiving one of said rods, locking means associated with said bushing, a U-shaped clamp on said top plate, said clamp having a resilient clamping surface for pressing against said legs when said legs are in the stored condition, said plate having padded way-receiving grooves in its bottom surface, and locking means securing said ways to said saddles.

14. A support as set forth in claim 13 wherein said article support means includes a swivel assembly for controlling the positioning of the article, said swivel assembly including a pair of swivel arms, a mounting block connecting each arm to a rod for vertical, horizontal and rotational movement therewith, a swivel bar rotationally connected to said swivel arms, a universal joint mounted on said swivel bar for holding the article, each of said mounting blocks including a slot and an aperture disposed substantially perpendicular to each other for receiving one of said swivel arms and its rod, locking means associated with each of said slot and said aperture, said swivel bar having a series of obliquely arranged indexing holes, said swivel bar being secured to one of said swivel arms by connecting member, a stop pin being in said connecting member engageable with one of said indexing holes, an auxiliary arm being secured to each rod by one of said mounting blocks, each of said auxiliary arms having an offset at one end thereof secured thereto by rotation means, fastening means at the other end of each arm for receiving an extension, and stop means on each rod for limiting the downward movement of said swivel assembly.

15. An article support in its stored condition comprising a pair of saddles, a pair of spaced ways secured to and across said saddles, each of said saddles having four grooves in its surface remote from said ways, four legs disposed against the remote surfaces of said saddles, said grooves of one saddle being aligned with grooves of the other saddles with each leg seated in a pair of aligned grooves, means clamping said legs to said saddles, and said legs and ways forming a skeletal box.

16. A support as set forth in claim 15 wherein a carrying strap is looped onto said skeletal box.

17. A support as set forth in claim 16 including a removable housing disposed in said skeletal box.

18. An article support comprising way means, support legs adapted to be secured to said way means, a pair of substantially vertical rods adapted to be secured to said way means, article-mounting means extending between and connected to said rods, said article-mounting means including a swivel assembly for controlling the up-and-down and the side-to-side and the back-and-forth positioning of the article, said swivel assembly including a pair of swivel arms, a mounting block connecting each swivel arm to one of said rods for vertical and rotational movement with respect to said rod, each arm being slidably mounted in its block for horizontal movement therewith, a swivel bar rotationally connected to said swivel arms, and a universal joint mounted on said swivel bar for holding the article.

19. A support as set forth in claim 18 wherein each of said mounting blocks includes a slot and an aperture disposed substantially perpendicular to each other for receiving one of said swivel arms and its rod, locking means associated with each of said slot and said aperture, said swivel bar having a series of obliquely arranged indexing holes, said swivel bar being secured to one of said swivel arms by a connecting member, and a stop pin in said connecting member engageable with one of said indexing holes.

20. A support as set forth in claim 19 including an auxiliary arm secured to each rod by one of said mounting blocks, each of said auxiliary arms having an offset at one end thereof secured thereto by rotation means, fastening means at the other end of each auxiliary arm for receiving an extension, and stop means on each rod to limit the downward movement of said swivel assembly.